United States Patent [19]

Nordstrom

[11] Patent Number: 4,805,852
[45] Date of Patent: Feb. 21, 1989

[54] AIRPLANE CARGO HANDLING SYSTEM

[75] Inventor: Arnold Nordstrom, Fallbrook, Calif.

[73] Assignee: Ancra Corporation, Hawthorne, Calif.

[21] Appl. No.: 39,709

[22] Filed: Apr. 20, 1987

[51] Int. Cl.$^4$ .......................... B64C 1/22; B64D 9/00
[52] U.S. Cl. ............................ 244/137.1; 244/118.1; 414/521; 414/352; 414/512; 410/128; 410/130; 410/132; 410/135; 410/139
[58] Field of Search ............... 244/118.6, 118.1, 137.1; 414/502, 521, 679, 512, 516, 532, 352; 410/121, 135, 129, 128, 130, 139, 132

[56] References Cited

U.S. PATENT DOCUMENTS

| | | | |
|---|---|---|---|
| 3,026,071 | 3/1962 | Barcellona et al. | 244/137.1 |
| 3,262,588 | 7/1966 | Davidson | 244/137.1 |
| 3,356,236 | 12/1967 | Shaw et al. | 414/502 |
| 3,522,919 | 8/1970 | Bader | 244/137.1 |
| 3,572,563 | 3/1971 | Oliver | 414/679 |
| 3,612,316 | 12/1969 | Baldwin | 244/137.1 |
| 3,756,544 | 9/1973 | Bader | 244/137.1 |
| 3,998,343 | 12/1976 | Fors | 414/521 |
| 4,032,092 | 6/1977 | Day | 244/137.1 |

FOREIGN PATENT DOCUMENTS 0124416  9/1979  Japan .................................. 414/532

*Primary Examiner*—Galen Barefoot
*Assistant Examiner*—Gregory R. Smith
*Attorney, Agent, or Firm*—Edward A. Sokolski

[57] ABSTRACT

A cargo handling system for use in combination with an airplane cargo compartment having a floor structure and a door opening moves cargo placed in the loading area inside the compartment at the door opening to the further recesses of the compartment and returns the cargo to the loading area for unloading. The system generally comprises fore and aft end panels, each attached to its own looped cable and movable from a position adjacent its respective end of the compartment to a position adjacent its respective side of the door opening; a movable main panel attached to a power cable; a drive means, such as a hydraulic cylinder, is attached to the power cable and drives the main panel in the door area between the door positions of the end panels; and indexing plungers which selectively couple the main panel with a cable of an end panel such that, when coupled, the end panel is driven simultaneously with and in the same direction as the main panel. The cables and rolling supports for the panels move in passageways in drive strips which extend the length of the compartment. Roller strips, lining the compartment floor, reduce friction. Exemplary embodiments include a removable door adapter and ball mat which aid in loading bulk or containerized cargo. In the preferred embodiment, the hydraulic cylinder is in a power pack which is removably attached to the main panel.

7 Claims, 4 Drawing Sheets

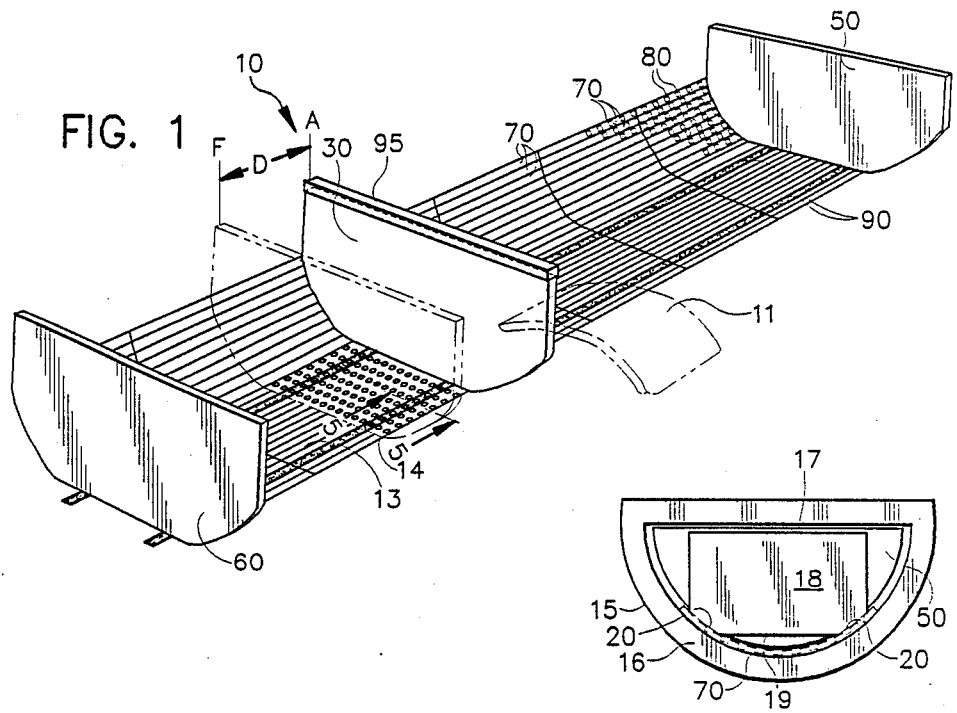
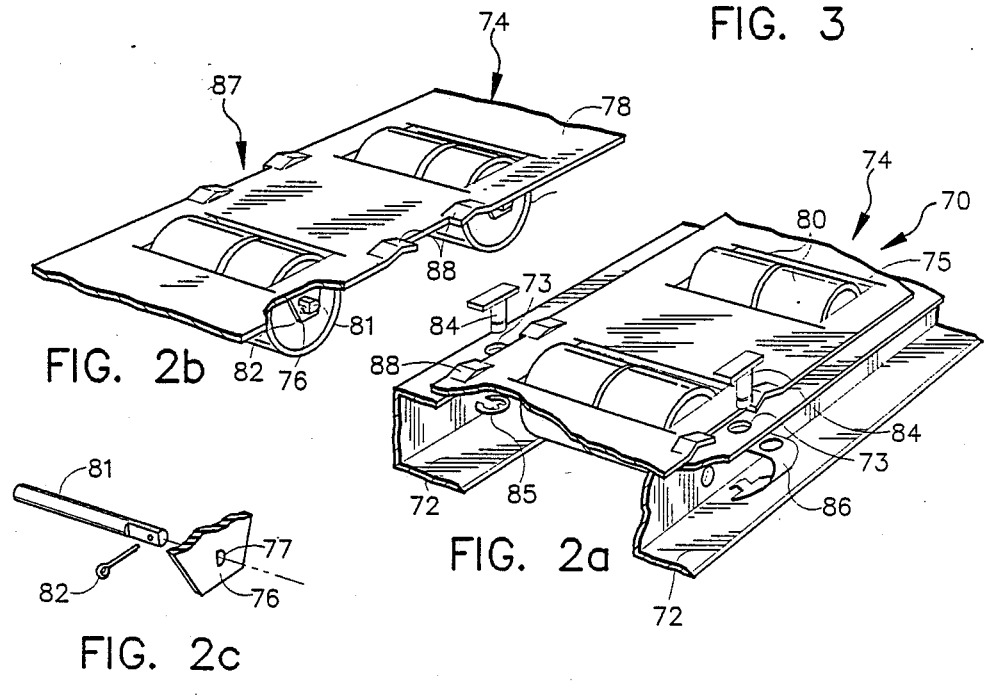

AIRPLANE CARGO HANDLING SYSTEM

BACKGROUND OF THE INVENTION

1. Field of the Invention

This invention relates in general to an aircraft cargo handling system and more particularly to an improved method and device for loading and unloading cargo, both containers and bulk, in an aircraft belly compartment.

2. Background of the Invention

The cargo compartment in the belly of a commercial airliner is typically elongate and semi-circular in cross-section. The curved lower aircraft body structure generally defines both the bottom and side walls of the compartment. A common ceiling height is approximately forty five inches. Because of the low ceiling and curved floor, men cannot easily work in the compartment, and cargo handling is difficult. Manual loading is physically hazardous work. While in a crouched or crawling position, a person must lift and stack forty to fifty pound bags, boxes, and cases. Therefore, other methods have been attempted for belly compartment cargo handling.

One method of belly compartment cargo handling comprises a series of pairs of conveyor belts and rollers mounted on the compartment floor. This method has been used in the Boeing 757. Incoming cargo is placed on a first pair of moving belts which conveys it to a second pair and then to a third pair and so on until the end of the available compartment space is reached. Each pair of belts must have its own motor, gearbox, and clutch, allowing it to be selectively activated so that it does not continue to run after its cargo can no longer move.

This modular belt system has several drawbacks. The system is only practical for standard containers and cannot readily handle bulk cargo. It requires a considerable amount of the usable compartment space. With the many motors and drive components, the system is quite heavy and detracts from the airplane's carrying capacity. It is complex and expensive. Importantly, because the system is modular, if one motor fails, the others must carry the overload. At the least, the cargo remaining on a failed module must be removed by hand.

In another prior art method, referred to here as the telescoping method, a series of successively smaller intersheaved shells lines the compartments. Upon loading, the shells are collapsed to a position adjacent the door opening whereby only the innermost shell is available for loading. After this innermost shell is loaded, it is extended into the compartment which permits the next shell to be loaded, etc. To unload, the cargo in the door area is removed, exposing the largest shell adjacent the door. When the largest shell is unloaded, the remaining shells are telescoped toward the door area and each is unloaded in sequence. The telescoping method is heavy and requires a different shell shape for each aircraft shape. It handles bulk cargo only. The shells take up considerable cargo volume since each shell is approximately one inch thick. The shells are easily damaged and can hang up and otherwise malfunction.

Therefore, it is desirable to have a powered cargo loading system for an aircraft belly compartment which is simple, reliable and can handle both bulk and containerized cargo, singly or intermixed.

It is further desirable that such a system be designed to minimize possible failure modes and that the most failure-prone components can be quickly replaced with minimal cargo removal.

It is further desirable that the system be light weight and require only a small volume. It is further desirable that the system is easily adaptable to the different aircraft shapes using common components.

SUMMARY OF THE INVENTION

This invention is a cargo handling system for use in combination with an airplane cargo compartment having a floor structure and a door opening. Except as noted, the system elements are disposed within the compartment. The system moves cargo placed in the loading area inside the compartment at the door opening to the further recesses of the compartment and returns the cargo to the loading area for unloading.

The system generally comprises fore and aft end panels, each attached to its own looped cable and movable from a position adjacent its respective end of the compartment to a position adjacent its respective side of the door opening; a movable main panel attached to a power cable; a drive means, such as a hydraulic cylinder, is attached to the power cable and drives the main panel in the door area between the door positions of the end panels; and indexing plungers which selectively couple the main panel with a cable of and end panel such that, when coupled, the end panel is driven simultaneously with and in the same direction as the main panel.

According to a further precept of the invention, the floor of the compartment is lined with a plurality of roller strips including roller panels which are arranged in removable sections. The cables and rolling supports for the panels move in passageways in drive strips which extend the length of the compartment.

According to an exemplary embodiment, the system includes a door adapter to aid in loading bulk cargo. The door adapter includes a hinged panel mounted in and traversing the door opening. The hinge axis is adjacent the door sill. In a lowered position, the panel serves as a platform, protects the door sill, and does not obstruct the door opening. In a raised position, the adapter covers the bottom portion of the door opening and allows bulk cargo to be stacked to a greater height and width in the loading area.

In the preferred embodiment, the hydraulic cylinder is in a power pack which is removably attachable to the main panel. As this contains the parts most subject to malfunction, its easy replacement reduces down time and airplane delay.

In operation, cargo to be loaded is placed in the loading area and the main panel is driven to push the cargo toward a compartment end. The main panel is returned, more cargo is loaded into the loading area, and the main panel is driven to push this cargo and the previous cargo. This is repeated. To unload, any cargo in the loading area is unloaded, the main panel is moved to its position adjacent the end from which cargo is to be unloaded, and the main panel is indexed to the cable attached to that end panel. The main panel is driven across the loading area, also pulling the end panel toward the door. The end panel pushes the cargo ahead of it toward the loading area. This is repeated as necessary.

Other features and many attendant advantages of the invention will become more apparent upon a reading of the following detailed description together with the drawings in which like reference numerals refer to like parts throughout. The drawings disclose by way of example, and not by way of limitation, the principles of the invention and the structural implementations of the inventive concept.

BRIEF DESCRIPTION OF THE DRAWING

FIG. 1 is a perspective view illustrating the cargo handling system of the invention as assembled inside an airplane belly compartment having a flat central floor portion.

FIGS. 2a-2c are three perspective views, partially cut away, showing the roller strips.

FIG. 3 is a cross-sectional representation of a fully radiused airplane belly compartment illustrating the invention's adaptability to such shape and ability to handle bulk and containerized cargo.

DETAILED DESCRIPTION OF THE INVENTION

Figure 4:
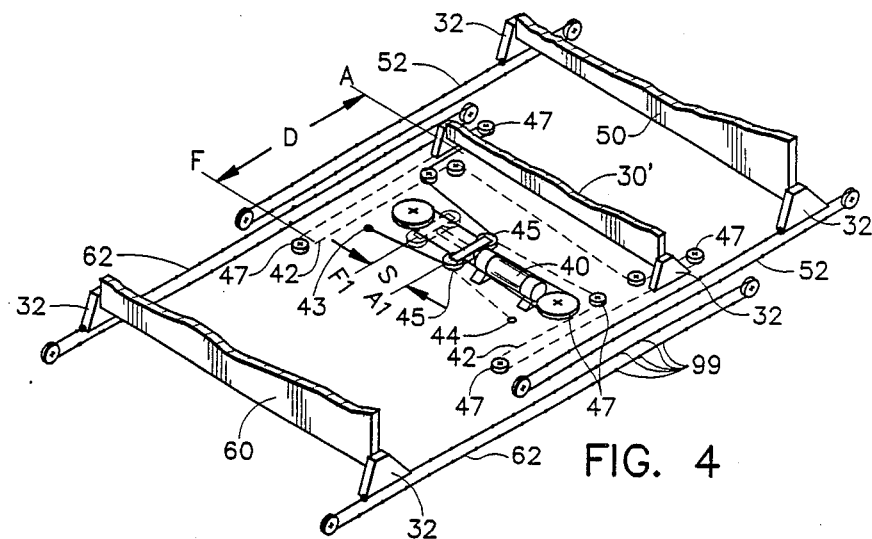
FIG. 4 is a schematical perspective view of an exemplary embodiment of the means for moving the cargo handling panels.

With reference now to the drawing, and more particularly to FIG. 1 thereof, there is shown a perspective view, partially cut away, of the major visible components of the cargo handling system, denoted generally as 10, of the invention as they are situated in the belly compartment of an airplane (not shown). The airplane's outer skin 15 and my reinforcing ribbing 16 (seen in FIG. 3) define the floor structure of the compartment. Compartment door 11 is shown by phantom lines to illustrate its typical cargo loading position, i.e. rotated outward and upward, relative to the compartment. That portion of the compartment inside the doorway and into which cargo can be placed is referred to as the loading area. Also, since the compartment typically has a concave floor structure which curves upward to form side walls which may or may not be vertical, and there may be no demarcation between floor and wall; the term "compartment floor" as used herein refers to such of this structure may support cargo and generally includes all structure below the ceiling.

The cargo handling system includes friction reduction means, such as roller strips 70, which generally line the floor of the compartment, and may include ball mat 14 in the loading area. A preferred embodiment of a roller strip, denoted generally as 70, is illustrated in FIG. 2 and includes rails 72 and a roller panel, denoted generally as 74. As best seen in FIG. 2b, roller panel 74 includes an upper surface 78, a plurality of roller apertures 75, and support flanges 76, which extend from its lower surface. A pair of rollers 80 are mounted on an axle, such as shouldered pin 81, which is supported on its ends by a pair of flanges 76. Rollers 80 project thru apertures 75 and protrude above panel upper surface 78. As seen in FIG. 2c, D-shaped flange hole 77 receives shoulder pin 81 and prevents its rotation. Suitable means, such as cotter pin 82, provides for easy removal and replacement of rollers 80.

As seen in FIG. 2a, rails 72, permanently attached to the floor structure, support roller panel 74 such that rollers 80 can turn freely. Typically, rails 72 are one inch in height, and rollers 80 are one inch in diameter. Roller sets 80 within a panel are mounted within a short distance from one another; preferably within approximately three and one-half inches. The top of each rail 72 supports the outside edge of two abutting roller panels 74 such that rollers 80 and the upper surface 78 form a continuous cargo-supporting surface. Roller panels 74 are removably fastened to rails 72, preferably by a quick-release method, such as by T-shaped, quarter-turn retained pin 84. Retained pin 84 passes thru hole 73 in rail 72 and is held by W-type snap ring 85 and is upward biased by preload spring 86. Notches 87 in the outside edge of roller panel 74 accommodate passage of the stem of retainer pin 84 and allow adjacent roller panels to abut. Formed deflectors 88 in the roller panel upper surface 78 prevent cargo from snagging on retainer pins 84. In the exemplary embodiment, roller panels 74 are in suitable modular lengths, such as forty inches, and are of narrow enough width, such as three and one-half inches, so that they may conform to the curved compartment wall. A ninety degree turn of retainer pin 84 either locks or unlocks the edge of both adjacent roller panels for their removal and replacement.

The narrow width of roller strips 70 allows them to conform to any of the several aircraft body shapes and to present a continuous, low-friction, bulk cargo transporting surface. FIG. 3 illustrates this ability. FIG. 3 is a cross-sectional view of an aircraft belly compartment which is fully radiused, such as on the DC8 and DC9. The airplane outer skin 15 and support structure, such as rib 16, define the floor of the compartment. Compartment ceiling 17 is the floor structure for the airplane cabin. Roller strips 70 are mounted on the floor structure. Their narrow width allows them to conform quite closely to the contours of the belly compartment.

FIG. 3 also shows the ability of roller strips 70 to support and handle standard containerized cargo. In cross-section, the bottom of a typical standard cargo container 18 has a flat mid-section 19 and radiused outer portions 20. The flat bottom is required to adapt to the terminal conveyor systems. Container 18 is fully supported by the roller strips 70 in the curved portion of the compartment. Volume loss of the flat-bottomed container 18 in a radiused belly is normal. However, bearing container 18 on the rollers in the curved portion of the belly precludes the addition of a continuous "flat" floor with its considerable weight and cost increase. For handling containerized cargo, ball mat 14 (see FIG. 1) which may be removable, is located on the floor of the loading area.

Returning once more to FIG. 1, the importance and advantages of roller strips 70 can now be better appreciated. The compartment floor may include a flat center section 13 as is common on airplanes such as the 727, 737, and 757. Roller strips 70 cover the floor of the compartment. Roller panels 74 are installed in sections beginning at the door area. For example there may be as many as five modular roller panel sections to either side of the loading area. Because cargo enters the compartment thru door 11 and is rolled fore and aft, the rollers nearer the door are used much more and subsequently wear more than the more remote rollers. Sectional installation of the roller panels 74, coupled with their ease in removal and replacement, allows the sections nearer the door to be replaced more often or, alternately, permits the exchange of the roller panels between sections to provide for even wear of all rollers. Also, if individual rollers 80 fail, it has been seen from the discussion of FIG. 2 that these are easily individually replaced.

Main drive panel 30, aft panel 50, and fore panel 60 approximate the cross-sectional area of the compartment in area and are movable longitudinally, i.e. fore and aft, in the compartment. Aft panel 50 is movable from its shown position, remote from the door and defining the aft end of the compartment, to a position near the aft side of the door opening. Fore panel 60 is movable from its position shown, remote from the door opening and defining the fore end of the compartment, to a position near the fore side of the door opening. Typically, in their remote positions, the fore and aft panels would abut bulkheads.

The main drive panel drive means may include power pack 95, which is described in greater detail later in reference to FIG. 7. Main drive panel 30 is drivable thru the distance D between position A, shown, which is immediately adjacent the fore most position of aft panel 50, and position F, shown in phantom lines, which is immediately adjacent the aft-most position of fore panel 60. Distance D, defined as the loading distance, is approximately the width of the door in the exemplary embodiment. Preferably, the lengths of both sides of the compartment, i.e. from point A to the compartment aft end and from point F to the compartment's fore end, are multiples of the loading distance D. The displacement of the drive panel moving distance D is defined as the loading volume. The section of the compartment demarcated by the fore and aft positions of main drive panel 30 shall be referred to generally as the loading area.

In FIG. 1, for descriptive purposes, the door opening is shown to be in mid-compartment so that cargo can be loaded both fore and aft. However, it will be seen that the invention is easily adaptable to the situation where door 11 accesses a compartment immediately adjacent a bulkhead so that cargo can only move one direction.

Bulk cargo entering the compartment is placed into the loading area from which it can roll longitudinally on rollers 80. Optional ball mat 14 is shown on the floor of the loading area. Ball mat 14 supports containers and allows them to be rolled into the loading area from the side.

Two drive strips 90 (shown on darker shade) run the length of the compartment and provide means for longitudinally moving panels 30,50,60.

Figure 5:
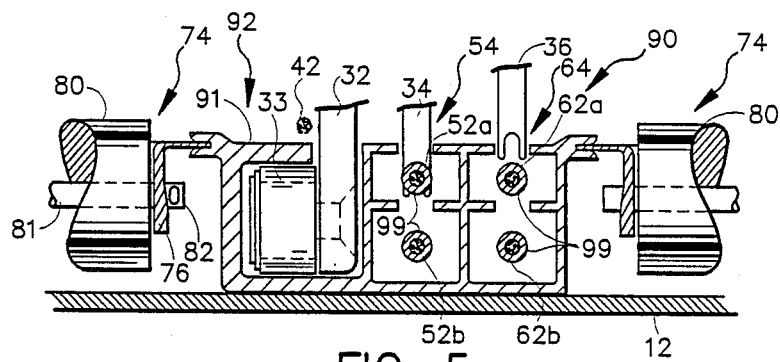
FIG. 5 is a cross-sectional view of a drive strip taken on line 5—5 of FIG. 1.

FIGS. 4 and 5 illustrate an exemplary embodiment of an alternate means for moving the panels. FIG. 4 is a partially cut away, perspective schematic view of an exemplary embodiment of the major components of a panel moving means. FIG. 5 is a cross-sectional view of an exemplary embodiment of a drive strip 90 along line 5—5 of FIG. 1 and illustrates the interrelationship of the panels 30,50,60 with the drive strip 90 and drive means. In general, main drive panel 30 is driven over the loading distance D by drive panel drive means including power stroke means, such as powered screw or hydraulic cylinder 40, and main drive panel drive transmission means including a flexible tension member, such as drive panel power cable 42, and anchored routing pulleys 47 (not all numbered).

The flat central floor configuration of FIG. 1 is common in 727 and 757 type aircraft. In these aircraft, the flat section 13 is approximately fifty inches wide. In this configuration, cylinder 40 could be located beneath the floor of the loading area and attached to the airplane structure in any powering and activating the drive panel drive means and such is not within the confines of this invention and will not be discussed in detail.

In the exemplary embodiment, drive power cable 42 may be thought of as a single cable having end anchors 43,44. It is connected to support footings 32 of drive panel 30 from both fore and aft. In FIG. 4, drive panel 30 is shown in its full aft position A. Hydraulic cylinder 40 moves power pulleys 45. To move drive panel 30 to fore position F, cylinder 40 moves power pulleys 45 thru stroke S from position A1, shown, to position F1, shown in phantom. Since, in this exemplary embodiment, this distance is one-fourth of loading distance D and the pulley ratio is one-to-four, drive panel 30 is driven distance D to the fore position F. It can be seen that the cable routing configuration shown completely manages cable 42 by simultaneously feeding out cable 42 attached to the front of support fittings 32 of drive panel 30 and taking in cable 42 attached to the back.

Reversing the direction of the power stroke again moves the power pulleys 45 thru distance S from position F1 to position A1, whereby main panel 30 once more is driven thru distance D, this time from position F to position A.

Aft panel 50 is attached to and driven by a looped flexible tension member assembly including aft cables 52. Fore panel 60 is also attached to and driven by a looped flexible tension member assembly including fore cables 62. Fore and aft cables 62,52 are in the shape of a loop and turn around pulley rollers at each endpoint. Indexing means, such as a plurality of swaged lugs 99 attached at intervals to cables 52,62 allow the cables and attached aft and fore panels 50,60 to be driven. Lugs 99 could be standard cylindrical tube lugs swaged onto the cable. Although cables and swaged lugs are shown as fore and aft panel drive transmission means, it is understood that other similarly functioning elements, such as chains or the like, could be used and are intended to be covered by the inventive concept of this invention.

FIG. 5 is a cross-sectional view taken along line 5—5 of FIG. 1. FIG. 5 illustrates a cross-sectional view of an exemplary embodiment of the port drive strip 90 in the loading area. The starboard drive strip is similar. Preferably, drive strip 90 is narrower in width than roller strips 70. Drive strip 90 is mounted on floor structure 12 and can support the roller panels 74 on either side, as is shown. top surface 91 is below the top of adjacent rollers 80, which support and transport cargo. Drive panel support fitting 32 is connected to and is movably supported by a plurality of spaced apart bearings 33, which roll in channel track 92 of drive strip 90. Spaced bearings 33 and channel track 92 counter moment induced to a panel when it pushes cargo. Drive panel power cable 42 attaches to both fore and aft of support fitting 32. Thus, it is seen how main drive panel 30 is driven.

Both forward and aft panels 60,50 are likewise movably supported by equivalent support fittings 32 and bearings 33 running in channel tracks 92 of drive strips 90.

Aft cable passageway 54 and fore cable passageway 64 within drive strip 90 are each comprised of top and bottom chambers in which the top and bottom runs 52a, 52b and 62a, 62b of their respective cables are disposed.

Cable engaging means, such as aft panel indexing plunger 34 and forward panel indexing plunger 36, are mounted in drive panel 30. Plungers 34,36 are lowered to engage their respective cables 52,62. Aft indexing plunger 34 is shown in the lowered, cable engaging position, and fore indexing plunger 36 is shown in the raised, disengaged position. When an indexing plunger is lowered, the lower end of the plunger is designed to engage a lug 99, as shown. Upon longitudinal movement of drive panel 30, the engaged lug 99, the cable and attached fore or aft panel are similarly moved. Indexing plungers 34,36 may be activated by any of several means, such as manual or hydraulic, which would be obvious to one skilled in the art and the exact nature of which is not germane to this inventive concept. Appropriate controls for the elements of the invention could be located on an outside edge of main drive panel 30 or other location accessible by loading personnel.

FIG. 6 is a representation of the operating sequence for handling cargo in the aft section of a cargo compartment using the system of the present invention. The cargo compartment, denoted generally as 22, terminates at fore bulkhead 24 and aft bulkhead 26 and includes aft compartment 22a and fore compartment 22b. Referring to FIG. 6a, when compartment 22 is empty, main drive panel 30, fore panel 60, and aft panel 50 typically are located in the positions shown. Cargo X, either bulk load or container, is loaded into the loading area. Referring to FIG. 6b, the drive means for main drive panel 30 is activated, thereby moving main drive panel 30 loading distance D from point F to point A. Main drive panel 30 forces cargo X and aft panel 50 aft a loading distance. In FIG. 6c, drive panel 30 is driven to position F. In FIG. 6d, cargo Y is loaded into the loading area. In FIG. 6e, the main drive means is activated to move panel 30 aft one loading distance, thereby pushing aft both cargo loads X,Y and aft panel 50 in front of it. This sequence is repeated until the aft section of the compartment is full as is shown with the inclusion of cargo Z in FIG. 6f. Although only three cargo loadings X,Y,Z are shown as filling the aft section 22a of the compartment, typically a fore or aft compartment section may hold as many as five loading segments.

Figure 6A:
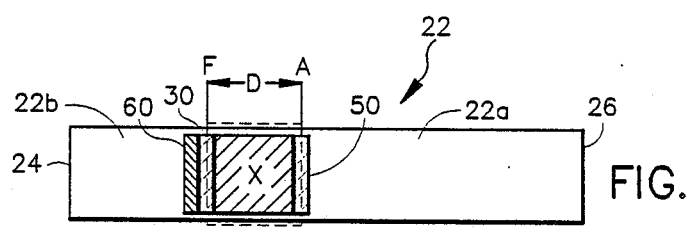
FIGS. 6a-6g illustrate the cargo handling sequence using the present invention.
Figure 6B:
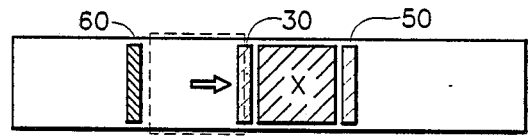
Figure 6C:
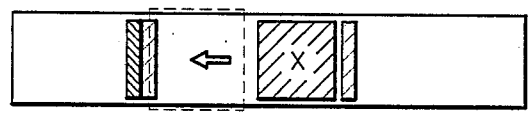
Figure 6D:
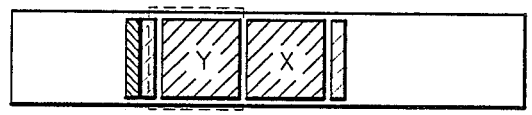
Figure 6E:
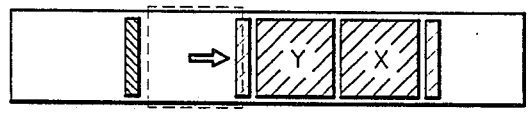
Figure 6F:
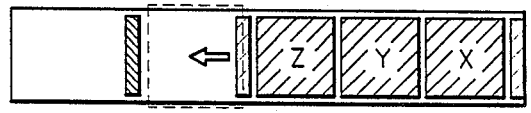
Figure 6G:
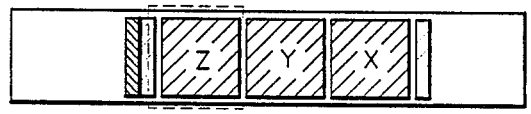

The unloading sequence is shown starting with FIG. 6f. With drive panel 30 at position A, aft plunger 34 is engaged. In FIG. 6g, the main drive panel drive means is activated to move drive panel 30 and aft panel 50 foreward loading distance D. Aft panel 50, driven by its cable 52, pushes all of the aft cargo X,Y,Z ahead of it, moving cargo Z into the loading area. Cargo Z in the loading area can now be offloaded. This sequence is repeated to unload the aft compartment.

Loading and unloading of fore section 22b is basically the reverse of the sequence described above with fore plunger 36 engaging and disengaging fore cable 62.

Figure 7:
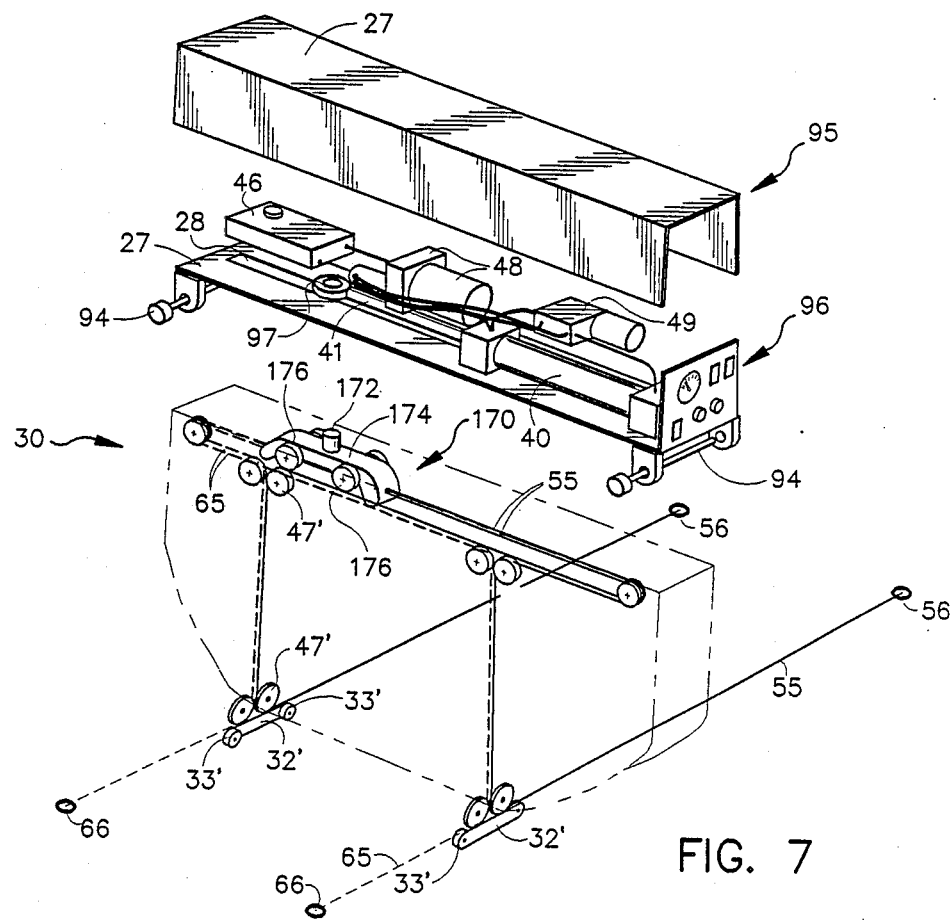
FIG. 7 is an exploded perspective view of a preferred embodiment of the main drive panel and its drive means.

FIG. 7 is an exploded perspective view of a preferred embodiment of the main drive panel and its drive means. The embodiment of FIG. 7 further simplifies the replacement of those parts most likely to fail and, therefore, reduces down time and the resulting delay of aircraft departure. This is a simplified configuration in that the main panel drive means is contained on or within drive panel 30. This allows the main drive panel to be contoured to fit any narrow body aircraft (727, 757, F100, DC8, DC9) irrespective of whether it has a flat floor or full radius type belly compartment.

In FIG. 7, a power pack, denoted generally as 95, includes housing 28 and is removably attached to the top of main panel 30 by quick release fittings 94. Power pack 95 contains the power stroke means, such as hydraulic cylinder 40 and its reservoir 46, pump 48, valves 49, and hoses. Hydraulic cylinder 40 powers push rod 41 nd hole 97 on its end thru stroke S.

A control panel 96 on the door-side end of power pack 95 houses the controls for hydraulic cylinder 40 and the indexing plungers 34,36 for driving aft and fore panels 50,60. A stress monitor gage, movement rate control, and other features could be provided on control panel 96. Power may be supplied to power pack 95 by any suitable means from the aircraft electrical system or from a ground power source.

The main drive panel drive transmission means, which translates the movement of push rod 41 into movement of main panel 30 and which is primarily disposed within main drive panel 30, includes power connection means, denoted generally as 170, fore and aft drive cables 65,55, and a plurality of routing pulleys 47' (not all numbered). Power connection means 170 includes pin 172 which exits the top of panel 30 thru a slot, enters housing 28 thru slot 27, and connects with hole 97. Pin 172 is mounted on trolley 174 which includes sets of spaced wheels 176 ride in channel tracks, not shown. Fore and aft drive cables 65,55 are anchored at one end 66,55 respectively within the drive strip and at the other end to trolley 174. From the configuration shown, it can be seen that outward movement of push rod 41 moves trolley 174 so as to drive main panel 30 in the aft direction, and inward movement of push rod 41 drives panel 30 in the fore direction. Trolley 174 takes up the moment forces of the power transfer so that fore and aft drive cables 65,55 receive only tension forces.

Other than the change of location of the main panel drive means and the other associated changes discussed above with respect to FIG. 7, the remaining components of the cargo handling system, including support fittings 32' and bearings 33', are basically the same as described previously and the system operates in the same manner.

It can be seen that the power pack embodiment of FIG. 7 allows for quick change of the drive and power components of the cargo handling system that are most likely to fail. It is envisaged that the ground crew will have spare power packs handy.

Figure 8:
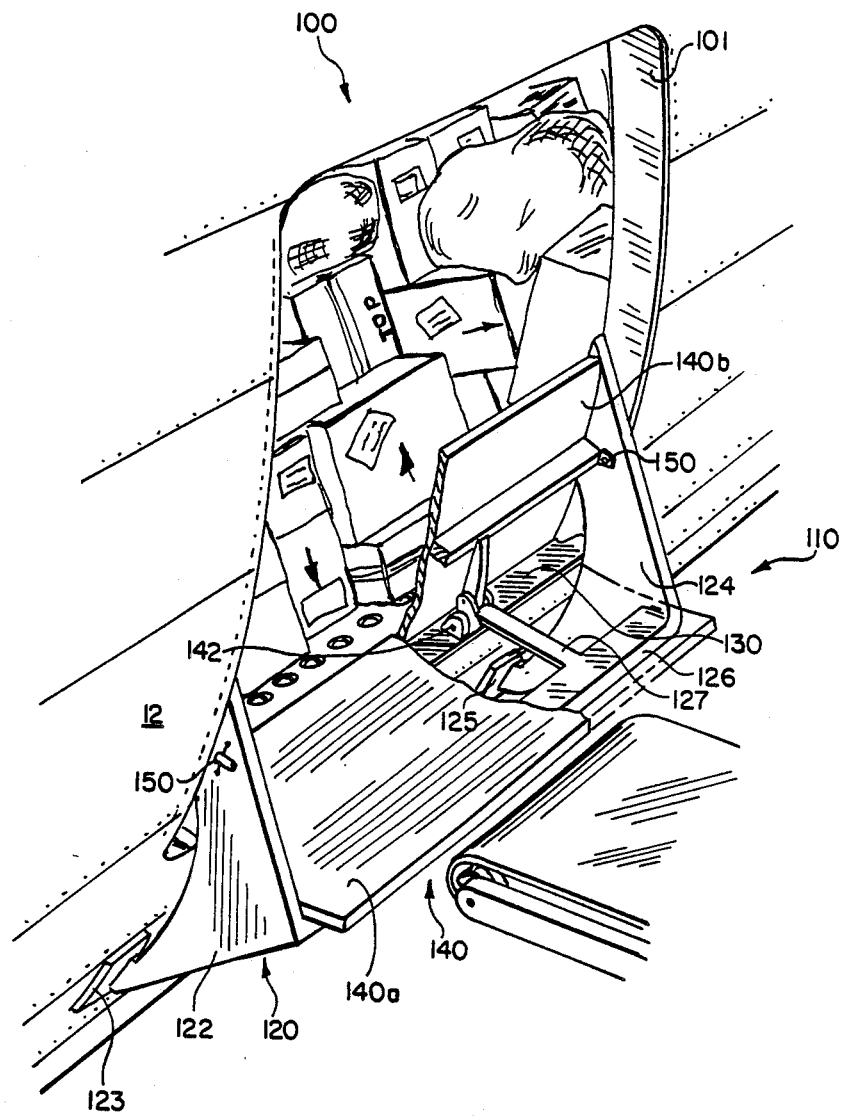
FIG. 8 is a perspective view of a cargo compartment door opening and attached adapter panel.

FIG. 8 is a perspective view of a typical door opening 100 including frame 101 to an airliner belly cargo compartment showing a door adapter, denoted generally as 110, for use in combination with the cargo handling system as described above when handling bulk cargo. Compartment door 11, not shown, typically is hingedly connected to the upper door frame and is latched to the lower frame with pins that enter holes in the frame. To load cargo the door is unlatched and is swung up and out of the way.

Bulk cargo door adapter 110 is attached to an airplane upon cargo loading and unloading. Adapter 110 includes a frame, denoted generally as 120, and hinged panel, denoted generally as 140, which is shown in broken view with an open section at position 140a and a raised section at position 140b. Frame 120 includes left and right vertical members 122,124 and cross member 126. The upper ends of vertical members 122,124 are attached to the door pin holes in the lower door jamb. Pads 123,125 on the lower end of vertical members 122,124 rest against airplane outer skin 12. Cross member 126 connects the vertical members outside of the door frame and includes arms 127 extending to the door sill 130. Hinges 142 connect the lower end of hinged panel 140 to end of arms 127 at the door sill. Hinged panel 140 extends across the door opening and protects door sill 130. Hinged panel 140 has a first position, denoted by broken view 140a, in which it is generally horizontal and is supported by frame 120. In this position, hinged panel 140 can support loading personnel and accommodate loading conveyers so that the loading area can be filled out to the door sill. At this time, hinged panel 140 is raised to position 140b and held by latches 150. The remaining volume in the door area can then be loaded by passing cargo over the top of hinged panel 140. The inner surface of panel 140 is curved to match up with the compartment wall and provide a smooth matching contour for cargo being moved into or out of the loading area.

From the foregoing description, it is seen that that the present invention provides an extremely simple, efficient, and reliable manner of handling both bulk and container cargo in an airplane belly compartment. Additionally, the system does not require any basic aircraft modifications and is easily adaptable to all compartment configurations.

Although particular embodiments of the invention have been illustrated and described, various changes may be made in the form, construction and arrangement of the parts herein without sacrificing any of its advantages, and it is to be understood that all matter herein is to be interpreted as illustrative and not in any limiting sense. Accordingly, the present invention is to be construed as limited only by the spirit and scope of the appended claims.

For brevity, as used in the following claims, the word "cable" denotes a flexible tension member, such as a cable, chain, or the like.

I claim:

1. In an aircraft, a cargo handling system comprising in combination:
   a cargo compartment having a floor structure and a door opening;
   an end panel within said compartment; said end panel movable between a first position adjacent said door opening and a second position away from said door opening and defining said compartment end;
   a drive panel within said compartment; said drive panel movable between a first position adjacent said door opening and a second position toward said compartment end from said drive panel first position and immediately adjacent said end panel first position;
   drive panel drive means for driving said drive panel longitudinally between its said positions such that, upon movement of said drive panel from its said first position to its said second position, any cargo therebetween is moved toward said compartment end; end panel drive means for driving said end panel from said second position toward said first position such that cargo between said positions is displaced toward said door opening; said end panel drive means comprising:
   an end panel drive assembly, including end panel drive transmission means attached to said end panel and disposed between said end panel second position and said drive panel first position;
   a power cable disposed between said drive panel first and second positions and connected to said drive panel such that movement of said power cable results in movement of said drive panel;
   power stroke means connected to said power cable for moving said power cable; and
   indexing means for selectively connecting said drive panel with said end panel drive transmission means such that, when so connected, said end panel moves simultaneously with and in the same direction as said drive panel.

2. The cargo handling system of claim 1 further comprising:
   door adapter means for aiding in filling the compartment with bulk cargo; said adapter means including a hingedly mounted door panel mounted in and traversing said door opening; said door panel having:
   a hinge axis adjacent to and paralleling the door sill;
   a lowered position about said hinge axis in which it does not obstruct said door opening;
   a raised position covering the bottom portion of said door opening such that bulk cargo can be loaded over said door panel; and
   means for retaining said door panel in said raised and lowered positions.

3. The cargo handling system of claim 1 wherein said power stroke means is removably attachable to said drive panel.

4. The cargo handling system of claim 3 wherein said power stroke means is an electrically driven hydraulic cylinder.

5. The cargo handling system of claim 3 wherein said power stroke means is a ball screw driven by an electric motor.

6. In an aircraft, a cargo handling system comprising in combination:
   a cargo compartment having a floor structure and a door opening;
   an end panel within said compartment; said end panel movable between a first position adjacent said door opening and a second position away from said door opening and defining said compartment end;
   a drive panel within said compartment; said drive panel movable between a first position adjacent said door opening and a second position toward said compartment end from said drive panel first position and immediately adjacent said end panel first position;
   drive panel drive means for driving said drive panel longitudinally between its said positions such that, upon movement of said drive panel from its said first position to its said second position, any cargo therebetween is moved toward said compartment end; said drive panel drive means including;
   power drive transmission means disposed between said drive panel first and second positions and connected to said drive panel such that movement of said power drive transmission means results in movement of said drive panel; and
   end panel drive means for driving said end panel from said second position toward said first position such that cargo between said positions is displaced toward said door opening; said end panel drive means comprising:
   an end panel drive assembly, including end panel drive transmission means attached to said end panel and disposed between said end panel second position and said drive panel first position;

indexing means for selectively connecting said drive panel with said end panel drive transmission means such that, when connected, said end panel moves simultaneously with and in the same direction as said drive panel; and drive strip means longitudinally disposed on said floor structure and having passages therein for containing said end panel drive transmission means between said drive panel first position and said end panel second position and said power drive transmission means between said drive panel first and second positions.

7. The cargo loading system of claim 6 further including:

a plurality of panel support means attached to said panels for providing low-friction movement of said panels and for counter-acting moment of said panels; and said drive strip means further includes means for supporting and guiding said panel support means and means for countering the moment of said panel support means so that said panel remain in an upright position.

* * * * *